United States Patent
Bindana et al.

(10) Patent No.: US 11,153,454 B2
(45) Date of Patent: Oct. 19, 2021

(54) HANDLING A DOCUMENT HAVING CONTENT MARKED USING ONE OR MORE IDENTIFIERS

(71) Applicant: XEROX CORPORATION, Norwalk, CT (US)

(72) Inventors: Srinivasarao Bindana, Kakinada (IN); Anand Arokia Raj Antony Muthu Rayar, Chennai District (IN); Jagadeeswaran Lakshmipathy, Chennai (IN); Satyasai Prasad Raparthi, Gollaprolu (IN)

(73) Assignee: XEROX CORPORATION, Norwalk, CT (US)

( * ) Notice: Subject to any disclaimer, the term of this patent is extended or adjusted under 35 U.S.C. 154(b) by 146 days.

(21) Appl. No.: 16/805,034

(22) Filed: Feb. 28, 2020

(65) Prior Publication Data

US 2021/0274059 A1    Sep. 2, 2021

(51) Int. Cl.
*H04N 1/00* (2006.01)

(52) U.S. Cl.
CPC ....... *H04N 1/00761* (2013.01); *H04N 1/0036* (2013.01); *H04N 1/00376* (2013.01); *H04N 1/00424* (2013.01); *H04N 1/00737* (2013.01); *H04N 1/00782* (2013.01)

(58) Field of Classification Search
None
See application file for complete search history.

(56) References Cited

U.S. PATENT DOCUMENTS

| | | | |
|---|---|---|---|
| 2004/0122659 A1* | 6/2004 | Hourihane | G06F 40/117 704/9 |
| 2009/0222525 A1* | 9/2009 | Jayawant Pattan | H04L 51/04 709/206 |

* cited by examiner

*Primary Examiner* — Eric A. Rust

(57) ABSTRACT

The disclosure discloses methods and systems for handling content of a document based on one or more identifiers. The method includes receiving the document having content marked using one or more starting identifiers and corresponding one or more ending identifiers, the content marked between each starting identifier and corresponding ending identifier indicates content for one of: extraction, deletion, replacement and sharing, the content in the document is marked using braille symbols. The content is marked using an erasable marking device without affecting the document. A selection of a function to be performed on the marked content is received. The document is scanned to generate a scanned document. The scanned document is analyzed to identify the one or more starting identifiers and the one or more ending identifiers. Based on the selection of the function to be performed on the marked content, perform one of: extraction, deletion, replacement and sharing.

34 Claims, 19 Drawing Sheets

400

16    O HENRY - 100 SELECTED STORIES was worth the $12 that Mr. Toosenberry always paid for it until he left to take charge of his brother's orange plantation in Florida near Palm Beach, where Mrs. McIntyre always spent the winters that had the double front room with private bath, you managed to babble that you wanted something still cheaper.

If you survived Mrs. Parker's scorn, you were taken to look at Mr. Skidder's large hall-room on the third floor. Mr. Skidder's room was not vacant. He wrote plays and smoked cigarettes in it all day long. But every room-hunter was made to visit his room to admire the lambrequins. After each visit, Mr. Skidder, from the fright caused by possible eviction, would pay something on his rent.

Then – oh, then – if you still stood on one foot with your hot hand clutching the three moist dollars in your pocket, and hoarsely proclaimed your hideous and culpable poverty, nevermore would Mrs. Parker be cicerone of yours. She would honk loudly the word 'Clara,' she would show you her back, and march downstairs. Then Clara, the coloured maid, would escort you up the carpeted ladder that served for the fourth flight, and show you the Skylight Room. It occupied 7 by 8 feet of floorspace at the middle of the hall. On each side of it was a dark lumber closet or store-room.

In it was an iron cot, a washstand and a chair A shelf was the dresser. Its four bare walls seemed to close in upon you like the sides of a coin. Your hand crept to your throat, you gasped, you looked uo as from a well— and breathed once more. Through the glass of the little skylight you saw a square of blue infinity.

'Two dollars, suh,' Clara would say in her half-contemptuous, half-Tuskegeenial tones.

One day Miss Leeson came hunting for a room. She carried a typewriter made to be lugged aroung by a much larger lady. She was a very little girl, with eyes and hair that kept on growing after she had stopped and that always looked as if they were saying: 'Goodness me. Why didn't you keep up with us?'

Mrs. Parker showed her the double parlours. 'In this closet,' she said, 'one could keep a skeleton or anaesthetic or coal –'

' But I am neither a doctor nor a dentist,' said Miss Leeson with a shiver.

Output:
425 → 1a: The results: Final: Brazil 2 (Jorge 84, Lazaro 90+3) bt Mexico 1 (Gonzalez 66).
433 → 1b: Two days after submitting his resignation, Rajat Sharma assumed charge following a directive from DDCA Ombudsman Justice (retd.) Badar Surrez Ahmed. The Ombudsman rejected the resignation on Sunday.
429 → 1c: Bruno Fernandez struck the opening goal on 39 minutes before Ronaldo tapped in a scrappy second late on to clinch second place in Group B behind winner Ukraine, which drew 2-2 in Serbia. Iranian striker Ali Daei holds the world record with 109 international goals scored in 149 appearances between 1993 and 2006.
423 → 2a: Just three days after it recovered from being 2-0 down to beat France 3-2 in the semifinals, Brazil scored two goals in the last 10 minutes to overcome its Latin rival.
437 → 2b: The series already won, India continued its domination over the West Indies by notching up a five run win in the rain truncated fourth women's T20 International here on Sunday. India now leads the five match series 4-0.

440

FIG. 4E addressed the letter to 'E. Rushmore Coglan, Esq., the Earth, Solar System, the Universe,' and have mailed it, feeling confident that it would be delivered to him.
∴ I was sure that I had at last found the one true cosmopolit since Adam, and I listened to his world-wide discourse fearful lest I should dicover in it the local note of the mere globe-trotter. ∴ But his opnions never fluttered or drooped; he was as impartial to cities, countries and continents as the winds or gravitation.
 And as E. Rushmore Coglan prattled of this little planet I thought with glee of a great almost-comopolite who wrote for the whole word and dedicated himself to Bombay. In a poem he has to say that there is pride and rivalry between the cities of the earth, and that 'the men that breed from them, they traffic up and down, but cling to their cities' hem as a child to the mother's gown.' And whenever they walk 'by roaring streets unknow' they remember their native city 'most faithful, foolish, fond; making her mere-breathed name their bond upon their bond.' And my glee was roused because I had caught Mr. Kipling napping. Here I had found a man not made from dust; one who had no narrow boasts of birthplace or country, one who, if he bragged at all, would brag of his whole round globe against the Martians and the inhabitants of the Moon.
∴ Expression on these subjects was precipitated from E. Rushmore Coglan by the third corner to our table. ∴ While Coglan was describing to me the topography along the Siberian Railway the orchestra glided into a medley. The concluding air was 'Dixie,' and as exhilarating notes tumbled forth they were almost overpowered by a great clapping of hands from almost every table.
∴ It is worth a paragraph to say that this remarkable scene can be witnessed every evening in numerous cafés in the City of New York. Tons of brew have been consumed over theories to account for it. ∴ Some have conjectured hastily that all Southerner in town hie themselves to cafés at nightfall. This applause of the 'rebel' air in a Northern city does puzzle a little; but it is not insolvable. The was with Spain, many years' generous min and water-melon crops, a few long-shot winners at the NewOrleans race-track, and the brilliant branquets given by Indiana and Kansas citizens who compose the North Carolina Society, have made the South rather a 'lad' in Manhattan. Your manicure will lisp softly that

When 'Dixie' was being played a dark-haired young man sprang up from somewhere with a Mosby guerrilla yell and waved frantically his soft-brimmed hat. Then he strayed through the smoke, dropped into the vacant chair at our table and pulled out cigarettes.

:·The evening was at the period when reserve is thawed. One of us mentioned three Wurzburgers to the waiter; the dark-haired young man acknowledged his inclusion in the order by a smile and a nod. I hastened to ask him a question because I wanted to try out a theory I had.:· ———— 465b 'Would you mind telling me, ' I began, 'whether you are from-'
*The fist of E. Rushmore Coglan banged the table* and I was jarred into silence.

'Excuse me,' said he, 'but that's a question I never like to hear asked. What does it matter where a man is from? Is it fair to judge a man by his post-office address? Why, I've seen Kentuckians who hated whisky, Virginians who weren't descended from Pocahontas, Indianians who hadn't written a novel, Mexicans who didn't wear velvet trousers with silver dollars sewed along the seams, funny Englishmen, spendthrift Yankees, cold-blooded Southerners, narrow-minded Westerners, and New Yorkers who were too busy to stop for an hour on the street to watch a one-armed grocer's clerk do up cranberries in paper bags. Let a man be a man and don't handicap him with the label of any section, 'Pardon me, 'I said, 'but my curiosity was not altogether an idle one. I know the South, and when the band plays "Dixie" I like to observe. I have formed the belief that the man who applauds that air with special violence and ostensible sectional loyalty is invariably a native of either Secaucus, N.J., or the district between Murray Hill Lyceum and the Harlem River, this city. I was about to put *my opinion to the test by inquiring of the gentleman when* you interrupted with your own - larger theory, I must confess.

And now the dark-haired young man spoke to me, and it became evident that his mind also moved along its own set of grooves.

'I should like to be a periwinkle, said he, mysteriously, on the top of a valley, and sing too-ralloo-ralloo.'

This was clearly too obscure, so I turned again to Coglan.

'I've been around the world twelve times,' said he. 'I know an Esquiman in Upernavik who sends to Cincinnati for his neckties, and I saw a goat-herder in Uruguay who won a prize in a Battle

FIG. 4G

Output:

455 — 1a: Expression on these subjects was precipitated from E. Rushmore Coglan by the third comer to our table 451 — 1b: I was sure that I had at last found the one true cosmopolite since Adam, and listened to his world-wide discourse fearful lest I should discover in it the local note of the mere globe-trotter.

463 — 2a: The evening was at the period when reserve is thawed. One of us mentioned three Würzburgers to the waiter; the dark-haired young man acknowledged his inclusion in the order by a smile and a nod. I hastened to ask him a question because I wanted to try out a theory I had.

459 — 2b: It is worth a paragraph to say that this remarkable scene can be witnessed every evening in numerous cafés in the City of New York. Tons of brew have been consumed over theories to account for it.

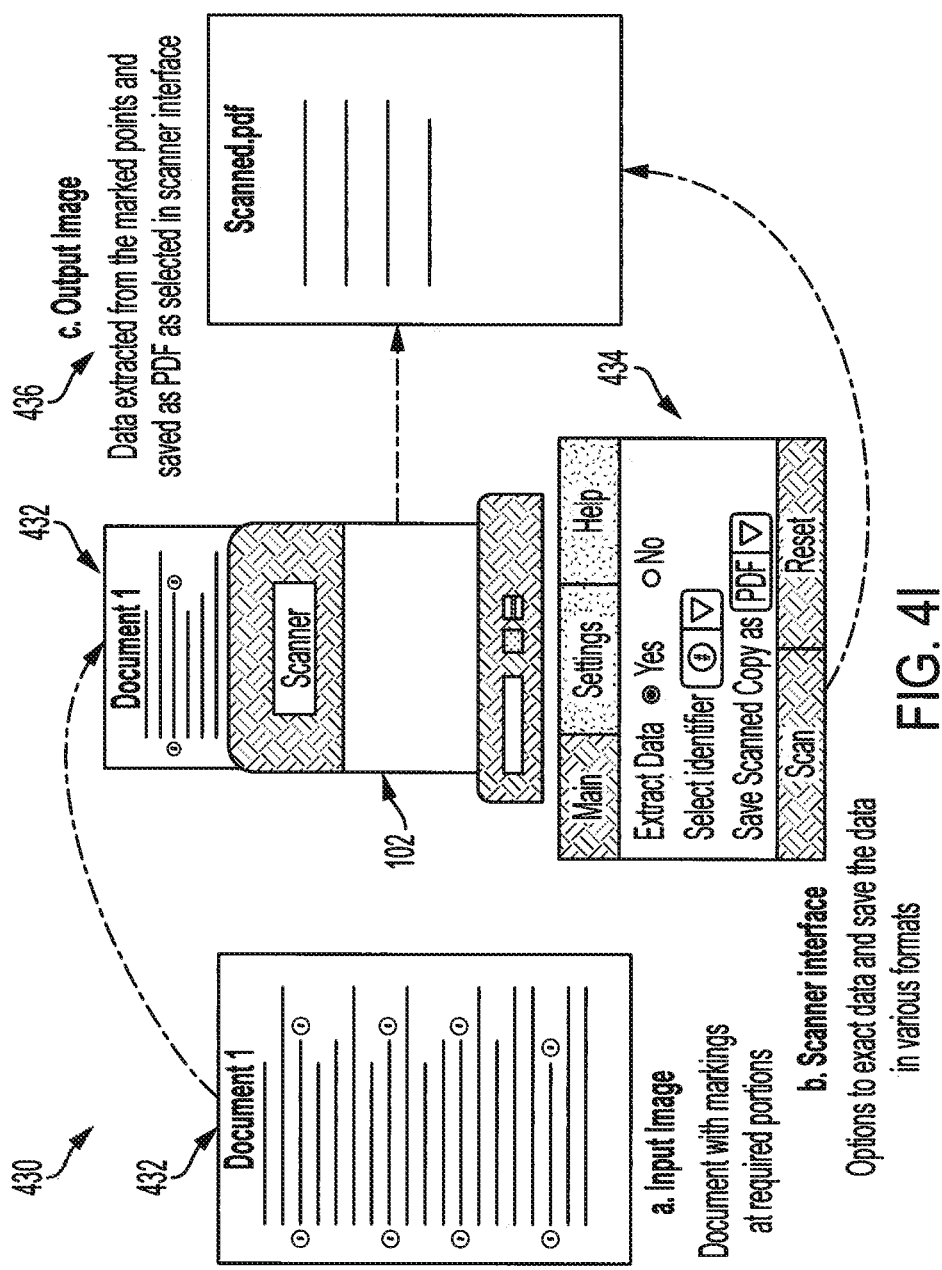

HANDLING A DOCUMENT HAVING CONTENT MARKED USING ONE OR MORE IDENTIFIERS

TECHNICAL FIELD

The presently disclosed subject matter relates to the field of scanning, and more particularly to methods and systems handling a document having content marked using one or more identifiers.

BACKGROUND

Typically, users use highlighters or markers to highlight content in a document which is relevant to the user. The content may be highlighted for reading purpose or for extraction. For extraction, the user submits the document with the highlighted content to a multi-function device. The multi-function device scans the document, and extracts the highlighted content. However, when the document is a large-sized document, it is tedious process for the user to manually highlight the content in the document. Marking with different colors might lead to confusion to the user and further makes the document less effective to use further. Most importantly, highlighting the content affect the original document and the user may not be able to use further. Therefore is a need for improvised methods and systems for highlighting content in the document and handling such documents thereafter.

SUMMARY

The present disclosure discloses methods and systems for handling content of a document based on one or more identifiers. The method includes receiving the document having content marked using one or more starting identifiers and corresponding one or more ending identifiers, wherein the content marked between each starting identifier and corresponding ending identifier indicates content for one of: extraction, deletion, replacement and sharing, wherein the content in the document is marked using braille symbols. A selection of a function to be performed on the marked content is received. Then, the document is scanned to generate a scanned document. The scanned document is analyzed to identify the one or more starting identifiers and the corresponding one or more ending identifiers. Based on the selection of the function to be performed on the marked content, perform one of: extracting the content marked between the one or more starting identifiers and the corresponding one or more ending identifiers, from the scanned document; deleting the content marked between the one or more starting identifiers and the corresponding one or more ending identifiers, from the scanned document; replacing the content marked between the one or more starting identifiers and the corresponding one or more ending identifiers, from the scanned document with a new content; and sharing the content marked between the one or more starting identifiers and the corresponding one or more ending identifiers, from the scanned document.

According to aspects illustrated herein, a method for extracting content from a document while scanning is disclosed. The method includes receiving the document having content marked using one or more starting identifiers and corresponding one or more ending identifiers, wherein the content marked between each starting identifier and corresponding ending identifier indicates content for extraction, wherein the content in the document is marked using braille symbols. Upon receiving, the document is scanned to generate a scanned document. The scanned document is analyzed to identify the one or more starting identifiers and the corresponding one or more ending identifiers. The content marked between the one or more starting identifiers and the corresponding one or more ending identifiers, is extracted from the scanned document. Finally, a new file is generated to include the extracted content.

According to further aspects, a method for deleting content from a document while scanning is disclosed. The method includes receiving the document having content marked using one or more starting identifiers and car responding one or more ending identifiers, wherein the content marked between each starting identifier and corresponding ending identifier indicates content for deletion, wherein the content is marked using braille symbols. The document is scanned to generate a scanned document. The scanned document is analyzed to identify the one or more starting identifiers and the corresponding one or more ending identifiers. The content marked between the one or more starting identifiers and the corresponding one or more ending identifiers, from the scanned document is identified. The identified content marked between the one or more starting identifiers and the corresponding one or more ending identifiers is deleted from the scanned document resulting in a different scanned document, wherein the resulted scanned document includes the remaining content.

According to further aspects illustrated herein, a multi-function device for extracting content from a document while scanning is disclosed. The multi-function device includes a platen, a scanner, and a controller. The platen is to receive the document having content marked using one or more starting identifiers and corresponding ending identifiers, wherein the content marked between each starting identifier and corresponding ending identifier indicates content for extraction, wherein the content is marked using braille symbols. The scanner is to scan the document to generate a scanned document. The controller is to: analyze the scanned document to identify the one or more starting identifiers and the corresponding one or more ending identifiers marked in the scanned document; extract the content marked between the one or more starting identifiers and the corresponding on or more ending identifiers, from the scanned document; and generate a new file to include the extracted content.

A multifunction device for handling content of a document based on one or more identifiers, the multi-function device includes a platen, a user interface, a scanner and a controller. The platen is to receive the document having content marked using one or more starting identifiers and corresponding one or more ending identifiers, wherein the content marked between each starting identifier and corresponding ending identifier indicates content for one of: extraction, deletion, replacement and sharing, wherein the content in the document is marked using braille symbols. The user interface is to receive a selection of a function to be performed on the marked content. The scanner is to scan the document to generate a scanned document. The controller is to: analyze the scanned document to identify the one or more starting identifiers and the corresponding one or more ending identifiers; and based on the selection of the function to be performed on the marked content, perform one of: extract the content marked between the one or more starting identifiers and the corresponding one or more ending identifiers, from the scanned document; delete the content marked between the one or more starting identifiers and the corresponding one or more ending identifiers, from the scanned document; replace the content marked between the one or more starting identifiers and the corresponding one or more ending identifiers, from the scanned document with a new content; and share the content marked between the one or more starting identifiers and the corresponding one or more ending identifiers, from the scanned document.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 3A is a snapshot of a user interface of the multi-function device, while FIG. 38 shows a table having braille symbols.

FIGS. 4A and 4B represent an input document and output of the input document, respectively. FIGS. 4C-4D and 4E represent an input document and output of the input document, respectively. FIGS. 4F-4G and 4H represent an input document and output of the input document. FIG. 4I shows an exemplary flow diagram.

DESCRIPTION

Figure 1:
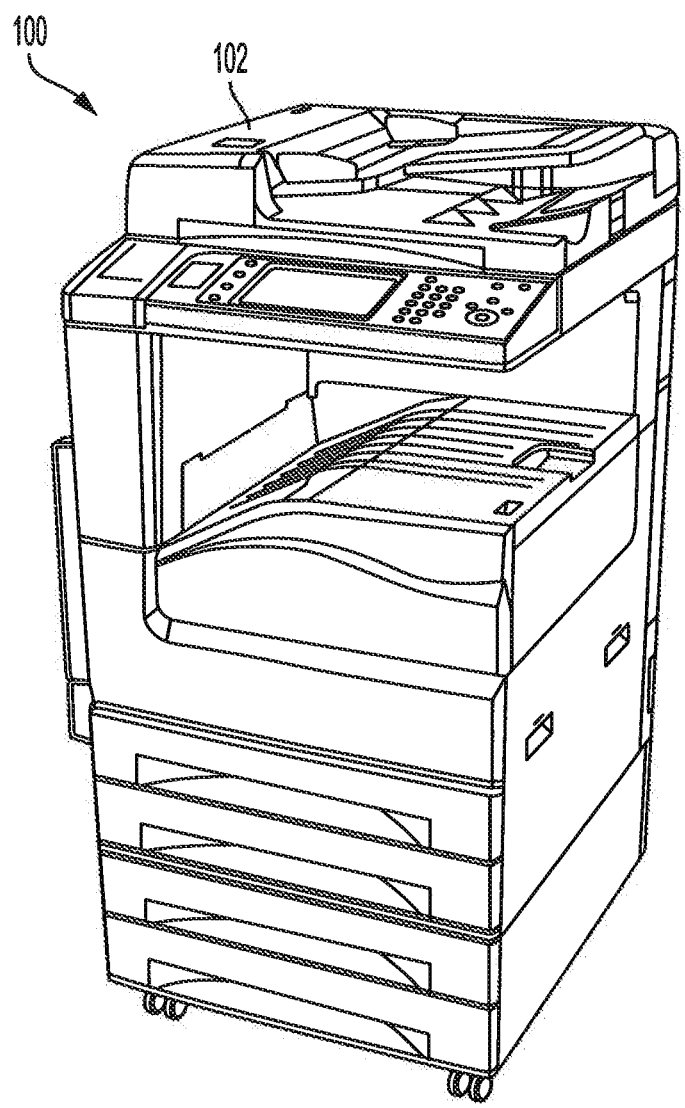
FIG. 1 shows an exemplary environment including a multi-function device in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "multi-function device" is a single device or a combination of multiple devices, to perform one or more functions such as, but not limited to, printing, imaging, scanning, and so forth. The multi-function device may include software, hardware, firmware, and combination thereof. In the context of the current disclosure, the multi-function device handles content of a document based on one or more identifiers. For example, the multi-function device extracts content from a document based on one or more identifiers. In another, example, the multi-function device deletes content from a document based on one or more identifiers. In further example, the multi-function device replaces content of a document with a new content based on one or more identifiers. In additional example, the multi-function device shares content of a document based on one or more identifiers.

A "document" refers to any document having content in the form of text, image, graphics or a combination thereof. The document can be in physical form, such as printed on paper. The document is submitted for scanning, where the document submitted is in the physical form. The document after scanning is outputted in an electronic form or a virtual form.

The term "identifiers" refer to alphabets, numeric, alpha-numeric symbols marked in the document. The identifiers include a starting identifier and a corresponding ending identifier. The starting identifier refers to an identifier marked before the start of the content. The ending identifier refers to an identifier marked after the end of the content. The starting identifier and the ending identifier are the same. For example, if an identifier i.e., a starting identifier is used to mark the content before the content starts, the same identifier (referred to as ending identifier) is used to mark the content after it ends. Each starting identifier has a corresponding ending identifier.

The term "erasable marking device" refers to a device for marking content in the document such that the markings can be removed or erased anytime at later stages.

The term "content" refers to content marked in the document using one or more identifiers. The content can be extracted from the document and further can be included in a new file. In such cases, the content is relevant for the user and is of interest of the user. The content can be deleted from the document. In such cases, the content is irrelevant for the user and may not be of interest for the user. The content can be replaced from the document with a new content. The content can be shared with one or more users or one or more devices.

Overview

The present disclosure discloses methods and systems for handling content of a document marked using one or more identifiers. The methods and systems cover various aspects such as extracting content from a document based on one or more identifiers, deleting content from a document based on one or more identifiers, replacing content from a document with a new content based on one or more identifiers and sharing content from a document based on one or more identifiers. According to the present disclosure, a user does not require to highlight the content, but the users marks the initial and final position of the content to be extracted, deleted, replaced, or shared using a starting identifier and an ending identifier, respectively. As one example, the methods and systems extract the content marked between the starting identifier and the ending identifier. The content marked using the identifiers may be key points which the user wants to refer. The markings denote the beginning and ending points of desired content as well as the order for the content to appear in the scanned output/document. In some examples, the content marked using the identifiers may be irrelevant and the user wishes to delete the content. In other examples, the content marked using the identifiers is to be replaced with a new content. In further examples, the content marked using the identifiers is to be shared with other users and/or devices.

Exemplary Environment

FIG. 1 shows an exemplary environment 100 in which various embodiments of the disclosure can be practiced. The environment 100 includes a multi-function device 102. The multi-function device 102 may be a single device or a combination of multiple devices for performing printing, scanning, copying, imaging or the like. The user uses the multi-function device 102 for printing, scanning, copying, imaging, or the like. In context of the present disclosure, the multi-function device 102 receives a document for scanning, having content marked using one or more identifiers. The content is marked using one or more starting identifiers and corresponding ending identifiers. In other words, the document may include one or more markings. The content marked between each starting identifier and ending identifier indicates the content that needs to be handled by the multi-function device 102. The content may be one or more lines. The content marked between the starting identifier and the corresponding ending identifier may represent the content for extraction. In other examples, the content marked between the starting identifier and the corresponding ending identifier may represent the content for deletion. In further examples, the content marked between the starting identifier and the corresponding ending identifier may represent the content to be replaced with a new content. In additional examples, the content marked between the starting identifier and the corresponding ending identifier may represent the content to be shared with one or more users and/or one or more devices in various forms.

Upon receiving the document, the multi-function device 102 provides a user interface to the user, the user interface displays one or more functions to be performed on the marked content. The user selects a function be to be performed on the marked content. For example, the user may select an extract function, a delete function, a replace function and a share function. The multi-function device 102 receives the selection of the function to be performed on the marked content. The multi-function device 102 scans the document to generate a scanned document. The multi-function device 102 analyzes the scanned document to identify the starting identifiers and corresponding ending identifiers marked in the document. The multi-function device 102 identifies content marked between each starting identifier and the corresponding ending identifier. Based on the selection of the function to be performed on the marked content, the multi-function device 102 performs one of: extracts the marked content, deletes the marked content, replaces the marked content with a new content and shares the marked content with the user, other users and/or devices.

Figure 3A:
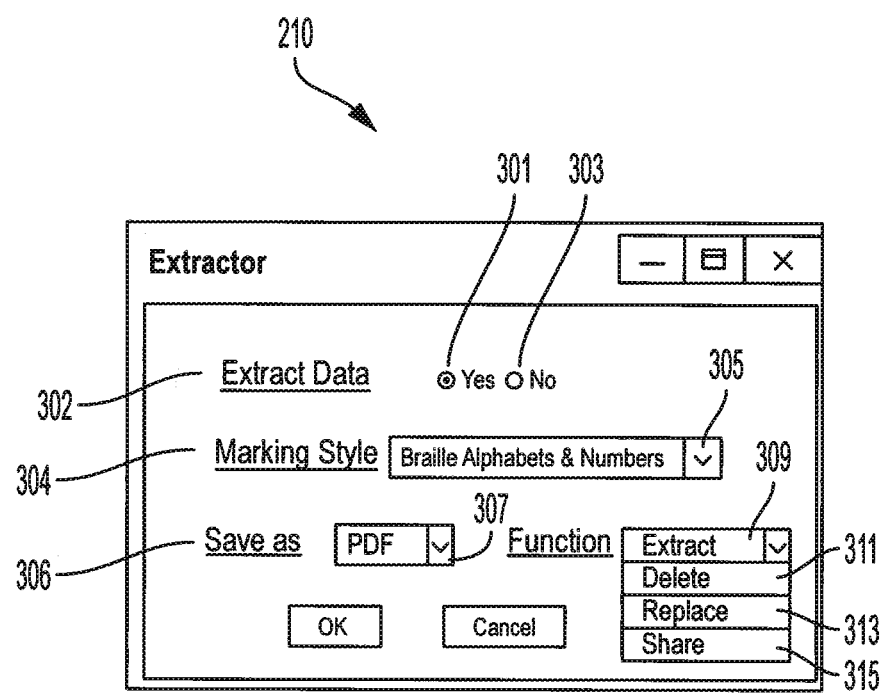
Figure 3B:
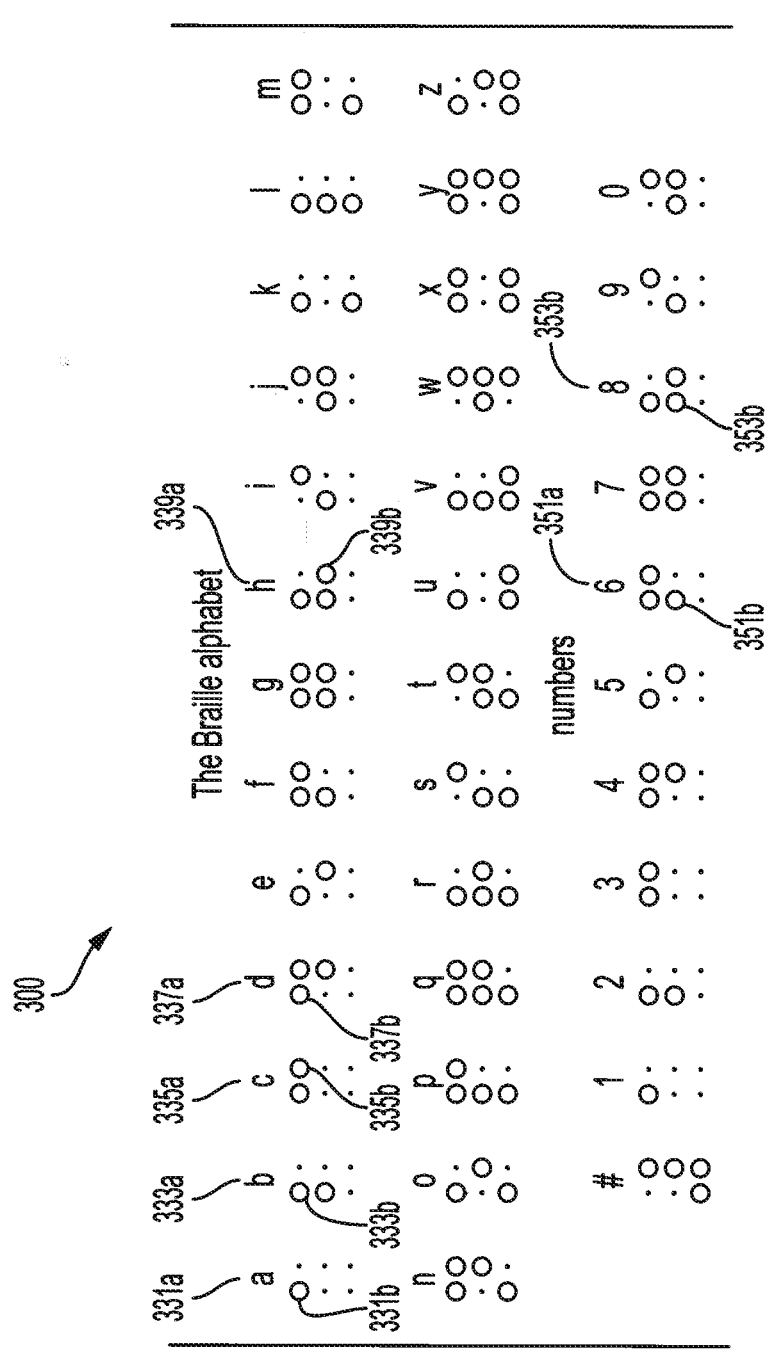

Before submitting the document to the multi-function device 102, the user manually marks the document using an erasable marking device such as a pencil. The user marks the content in the document using braille alphabets, braille numbers, or a combination thereof. For this, the user is provided with a reference table 300 having alphabets and numbers with corresponding braille symbols representation as shown in FIG. 3B. For example, if the user wishes to mark the content in the document using an alphabet "a" (marked as 331a), the user uses the braille representation marked as 331b for the alphabet "a". Similarly, the braille representation of alphabets b, c, d, h (marked as 333a, 335a, 337a, 339a, respectively) and so on is shown as 333b, 335b, 337b, and 339b, respectively and so on. On the similar lines, the numbers 6 (marked as 351a) and 8 (marked as 353a) are represented as 351b and 353b in braille format, respectively. The user can use any of the braille representation to do the markings in the document based on the requirement. For example, the user can simply use braille alphabets to do the markings. In other examples, the user can use braille numbers to do the markings i.e., one or more starting identifiers and corresponding ending identifiers. The user can use braille numbers when the content needs to be extracted in a particular sequence. In some cases, if the document is huge and then the user can use a combination of alphabets and numbers to do the markings. These are few examples discussed just for the sake of understanding but there can be many more variations. The marked content may include one or more lines. Marking the content using the braille symbols does not affect the document submitted for scanning, keeps the document clean, and is easy to read.

One representation of the document 400 having marked content is shown in FIG. 4A. As per the example shown in FIG. 4A, the document includes 3 markings. The first marking refers to the content marked between the identifiers 401a and 401b, where 401a is the starting identifier and 401b is the ending identifier. The starting identifier 401a and the ending identifiers 401b are based on the braille symbols. Here, the identifiers 401a and 401b represent the braille number 3. The content marked between the identifiers 401a and 401b is represented as 402. Further, the second marking refers to the content marked between the identifiers 403a, and 403b, where 403a is the starting identifier and 403b is the ending identifier. Here, the starting identifier 403a and the ending identifier 403b represent the braille number 1. The content marked between the identifiers 403a and 403b is represented as 404. Further, the third marking refers to the content marked between the identifiers 405a, and 405b, where 405a is the starting identifier and 405b is the ending identifier. Here, the starting identifier 405a and the ending identifier 405b represent the braille number 2. The content marked between the identifiers 405a and 405b is represented as 406. In this manner, the user can mark the content given in the document using one or more identifiers i.e., starting and ending identifier before submitting the document to the multi-function device 102. More examples of the document having markings are shown in subsequent figures.

Figure 4B:

The markings done in the document 400 represent the content, for example, for extraction. The extracted content is arranged according to a sequence identified in the braille symbols. The output obtained after scanning is shown in FIG. 4B. The output represents a new file 420 including the extracted content as 404, 406, and 402.

Figure 4C:
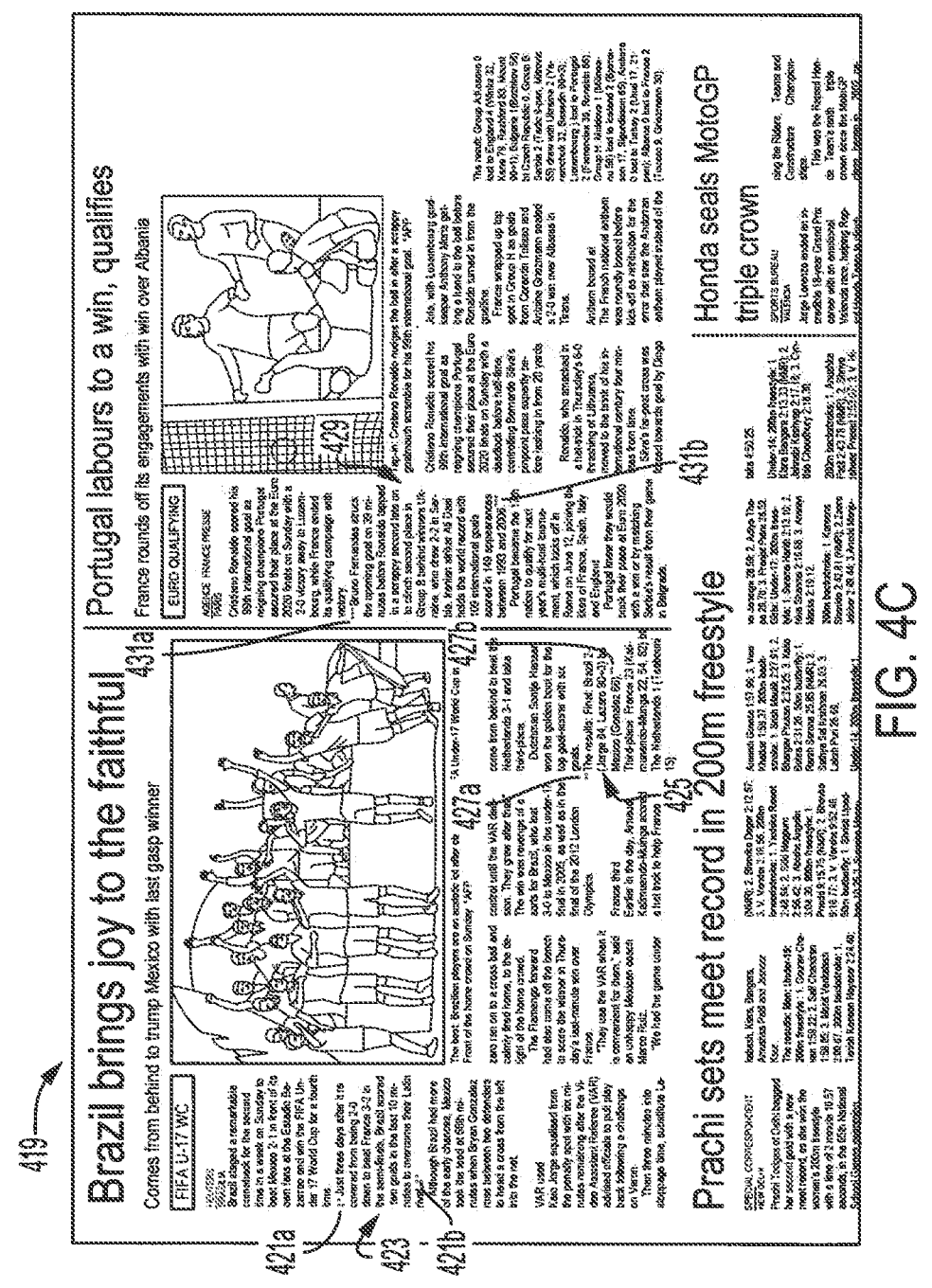
Figure 4D:
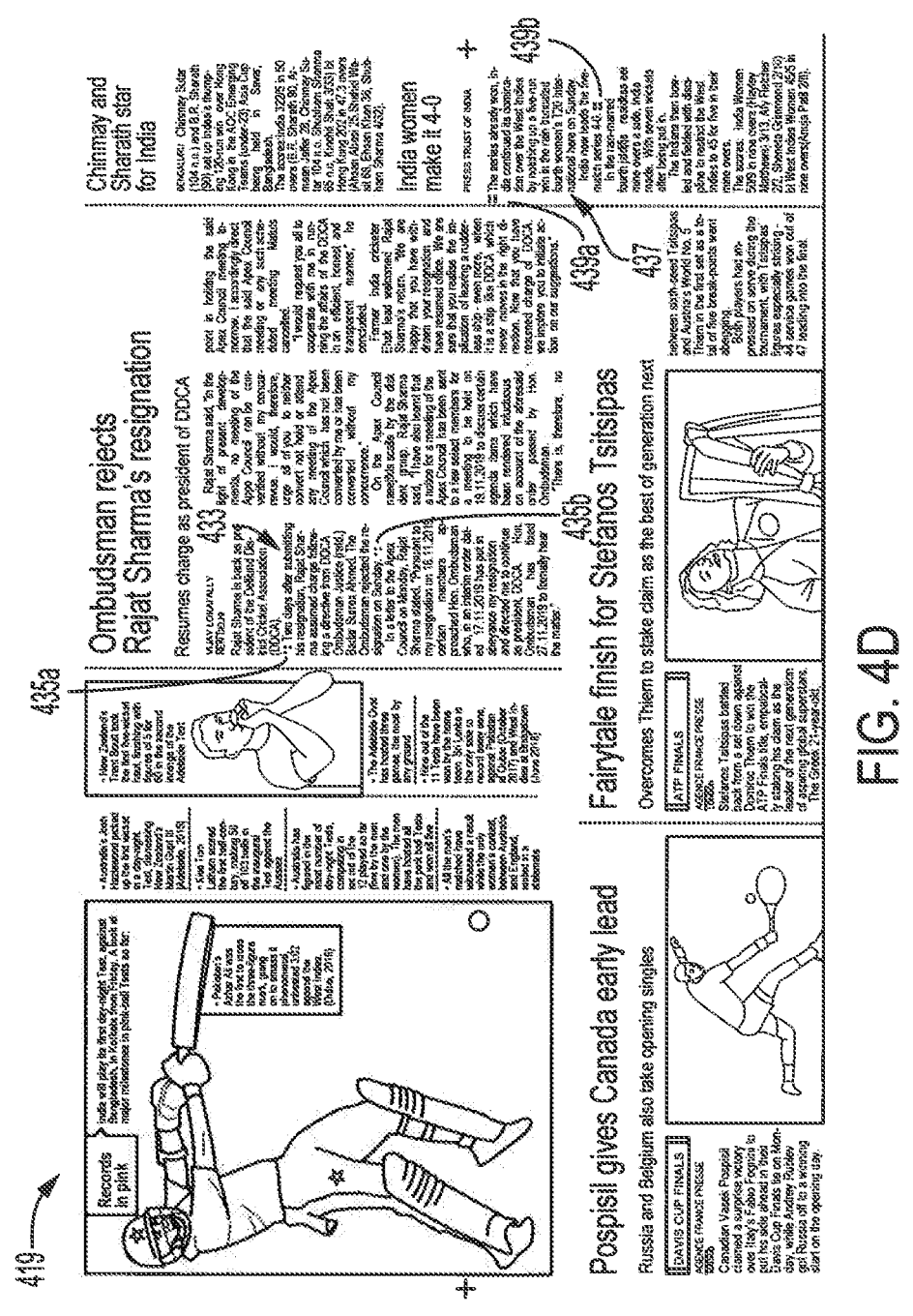

Another exemplary document such as document 419 is shown in FIG. 4C-4D. The document 419 includes 5 markings i.e., content is marked using 5 starting identifiers and corresponding ending identifiers. The first marking refers to the content (marked as 423) marked between the identifiers 421a and 421b, where 421a is the starting identifier and 421b is the ending identifier. The starting identifier 421a and the ending identifier 421b are based on the braille alphanumeric symbols. Here, the starting identifiers 421a and 421b represent the braille symbol 2A. Further, the second marking refers to the content 425 marked between the identifiers 427a and 427b, where 427a is the starting identifier and 427b is the ending identifier. The starting identifier 427a and the ending identifier 427b are based on the braille alphanumeric symbols. Here, the starting identifiers 427a and 427b represent the braille symbol 1a. Further, the third marking refers to the content 429 marked between the identifiers 431a and 431b, where 431a is the starting identifier and 431b is the ending identifier. The starting identifier 431a and the ending identifier 431b are based on the braille alphanumeric symbols. Here, the identifiers 431a and 431b represent the braille symbol 1c. Furthermore, the fourth marking refers to the content 433 marked between the identifiers 435a and 435b, where 435a is the starting identifier and 435b is the ending identifier. The starting identifier 435a and the ending identifier 435b are based on the braille alphanumeric symbols. Here, the starting identifier 435a and the ending identifier 435b represent the braille symbol 1b. Further, the fifth marking refers to the content 437 marked between the identifiers 439a and 439b, where 439a is the starting identifier and 439b is the ending identifier. The starting identifier 439a and the ending identifier 439b are based on the braille alphanumeric symbols. Here, the starting identifiers 439a and 439b represent the braille symbol 2b.

The markings done in the document 419 represent the content, for example, for extraction. The extracted content is arranged according to a sequence identified in the braille symbols. The output obtained after scanning is shown in FIG. 4E. The output represents a new file 440 including the extracted content in the sequence as 425, 433, 429, 423, and 437. As seen clearly from FIG. 4E, the content is arranged according to sequence identified in the braille symbols. For example, the content 425 represented using the identifiers 1a i.e., 427a and 427b is arranged first, followed by the content 433 represented using the identifiers 1b i.e., 435a and 435b, followed by content 429 represented using the identifiers 1c, i.e., 431a and 431b, followed by content 423 represented using the identifiers 2a, i.e., 421a and 421b and finally followed by the content 437 represented using the identifiers 2b i.e., using 439a and 439b.

One more exemplary document 450 is shown in FIG. 4F-4G. The document 450 includes 4 markings i.e., content is marked using 4 starting identifiers and corresponding ending identifiers. The first marking refers to the content (marked as 451) marked between the identifiers 453a and 453b, where 453a is the starting identifier and 453b is the ending identifier. The starting identifier 453a and the ending identifier 453b are based on the braille alphanumeric symbols. Here, the starting identifier 453a and the ending identifier 453b represent the braille symbol 1b. Further, the second marking refers to the content 455 marked between the identifiers 457a and 457b, where 457a is the starting identifier and 457b is the ending identifier. The starting identifier 457a and the ending identifier 457b are based on the braille alphanumeric symbols. Here, the starting identifier 457a and the ending identifier 457b represent the braille symbol 1a. Further, the third marking refers to the content 459 marked between the identifiers 461a and 461b, where 461a is the starting identifier and 461b is the ending identifier. The starting identifier 461a and the ending identifier 461b are based on the braille alphanumeric symbols. Here, the starting identifier 461a and the ending identifier 461b represent the braille symbol 2b. Furthermore, the fourth marking refers to the content 463 marked between the identifiers 465a and 465b, where 465a is the starting identifier and 465b is the ending identifier. The starting identifier 465a and the ending identifier 465b are based on the braille alphanumeric symbols. Here, the starting identifier 465a and the ending identifier 465b represent the braille symbol 2a.

The markings done in the document 450 represent the content, for example, for extraction. The extracted content is arranged according to a sequence identified in the braille symbols. The output obtained post scanning is shown in FIG. 4H. The output represents a new file 460 including the extracted content in the sequence as 455, 451, 463, and 459. As seen clearly from FIG. 4F, the content is arranged according to sequence identified in the braille symbols. For example, the content 455 represented using the identifiers 1a i.e., 457a and 457b is arranged first, followed by the content 451 represented using the identifiers 1b i.e., 453a and 453b, followed by content 463 represented using the identifiers 1c, i.e., 465a and 465b, followed by content 459 represented using the identifiers 2a, i.e., 461a and 461b.

The examples discussed above are wrt to the extraction of content, but the disclosure can be implemented for any function to be performed on the marked content such as deletion, replacement, sharing or the like. One such flowchart covering all aspects is discussed below.

Figure 7A:
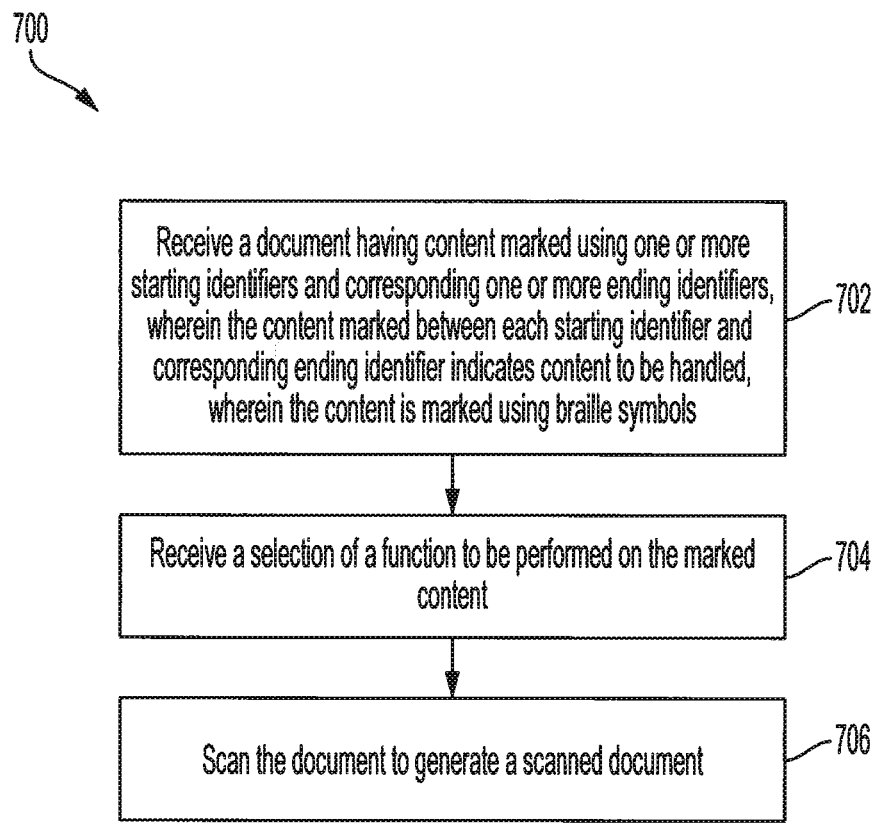
FIGS. 7A-7B represent a method flowchart for handling content of a document based on one or more identifiers.
Figure 7B:
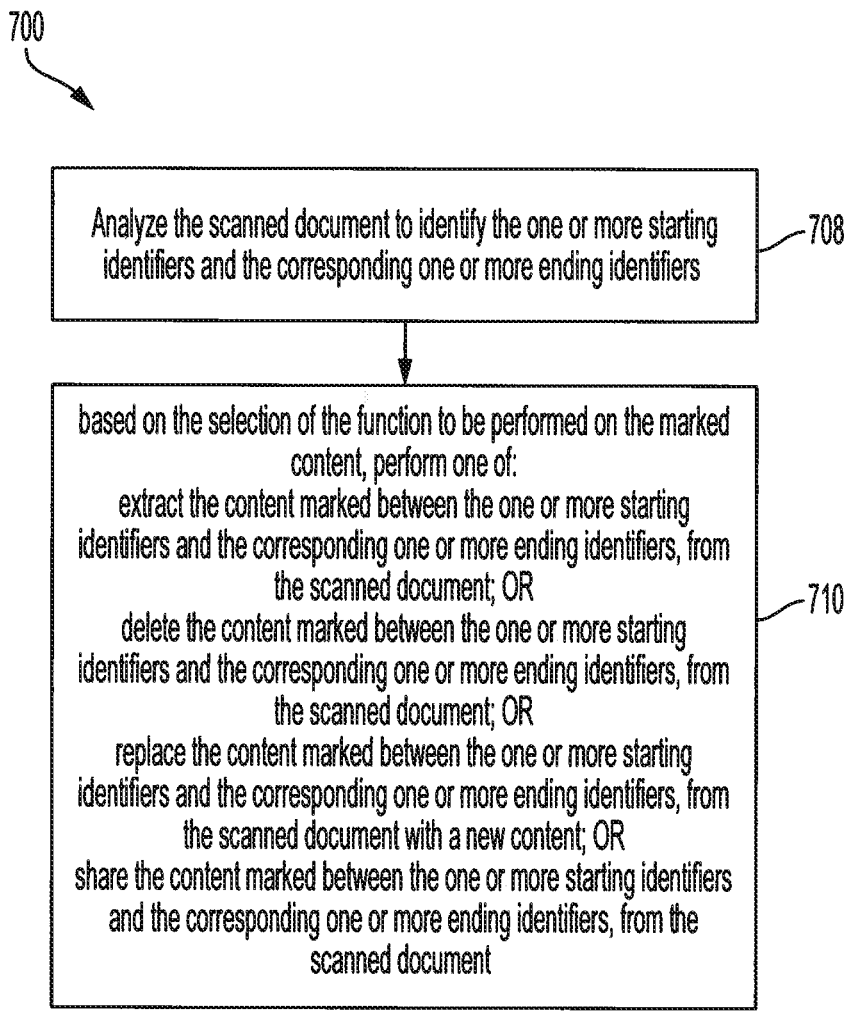

FIGS. 7A-7B represent a method flowchart 700 for handling content of a document based on one or more identifiers. The method 700 begins at 702 with receiving a document having content marked using one or more starting identifiers and corresponding one or more ending identifiers, wherein the content marked between each starting identifier and corresponding ending identifier indicates content for one of: extraction, deletion, replacement and sharing, wherein the content in the document is marked using braille symbols. Then, a user interface displaying one or more functions to be performed on the content marked between the one or more starting identifiers and the corresponding one or more ending identifiers is provided. Based on the displayed one or more functions, the user selects a function to be performed on the marked content. Then, at 704, a selection of the function to be performed on the marked content is received. Then, scanning of the document is initiated and the document is scanned to generate a scanned document at 706. The scanned document is analyzed to identify the one or more starting identifiers and the corresponding one or more ending identifiers at 708. The content marked between the one or more starting identifiers and the corresponding one or more ending identifiers is identified from the scanned document.

At 710, based on the selection of the function to be performed on the marked content, performing one of: extraction of the marked content, deletion of the marked content, replacement of the marked content or sharing of the marked content, Extraction It can be considered that the function to be performed on the marked content is extraction. In such cases, the content marked is extracted and a new file is generated to include the extracted content. The file may be a PDF, the like. The file may be in an editable format. In other examples, the file may not be in editable format. Further, the file may be printed by the multi-function device 102 based on the requirement of the user. In this manner, the content which is relevant for the user is extracted without requiring any effort from the user to highlight the document/content and also without affecting the document submitted for the scanning.

Deletion

It can be considered that the function to be performed on the marked content is deletion. In such implementations, the content marked is deleted from the scanned document resulting in a different scanned document including the remaining content. Here, the content marked represents the content which may be irrelevant for the user.

Replace

It can be considered that the function to be performed on the marked content is replace. In such cases, the content marked is replaced with a new content. A user interface is provided to input the new content to be included in place of the marked content in the scanned document. This results in a different scanned document including the new content as input by the user (in place of the marked content) and the earlier content.

Sharing

It can be considered that the function to be performed on the marked content is share. In such implementations, the content marked is shared with the user via email or other ways. The user provides his email address. The content can be shared with other users via email address or other ways. The content can be shared with other devices such as other multi-function devices connected to the multi-function device 102.

Although the present disclosure is discussed with respect to extraction of content as an example, but it is understood that the disclosure is applicable for examples such as deletion, replace, share or other case scenarios although not mentioned here without limiting the scope of the disclosure.

Exemplary System Components

Figure 2:
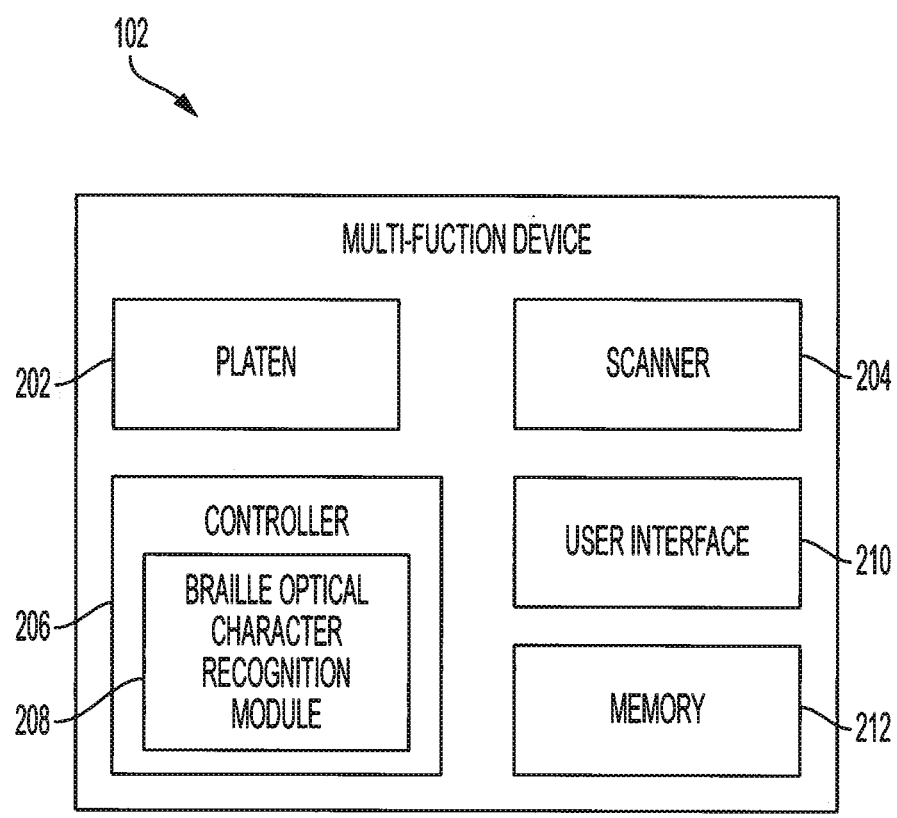
FIG. 2 is a block diagram illustrating various system components of the multi-function device, in accordance with an embodiment of the present disclosure.

FIG. 2 is a block diagram 200 illustrating various components of a device such as a multi-function device 102. The multi-function device 102 includes a platen 202, a scanner 204, a controller 206 having a braille optical character recognition module 208, a user interface 210, and a memory 212. Each of the components 202-212 is connected to each other via a conventional bus or a later developed protocol. Further, each of the components 202-212 communicates with each other for performing various functions of the present disclosure. The memory 212 may store all required details/information for implementing the current disclosure such as scanned document, table having alphabets, numbers and corresponding braille symbols representation and so on.

Initially, the user marks content in a document. The content may be marked for extraction, deletion, replacement, or sharing. The user may wish to extract the content for reading, reference, etc. The user may wish to delete the content. The user may wish to replace the content with a new content. The user may wish to share the content. The content is marked using one or more starting identifiers and corresponding ending identifiers. The document having content marked using the one or more starting identifiers and corresponding ending identifiers is submitted to the multi-function device 102 for processing. Specifically, the user submits the marked document to the platen 202.

The platen 202 receives the document having content marked using the one or more starting identifiers and corresponding ending identifiers. The controller 206 detects that the platen 202 receives the document and further triggers the scanner 204.

The scanner 204 initiates scanning of the document and scans the document as submitted by the user. The scanner 204 generates a scanned document post scanning. The scanner 204 submits the scanned document to the controller 206 for further processing. The controller 206 further provides a user interface 210 to the user. The user interface 210 displays one or more options to the user. For example, the user interface 210 asks the user whether he wishes to extract the content, delete the content, replace the content or share the content. The user interface 210 further allows the user to select a marking style, for example, braille alphabets and numbers. The user selects the marking style via the user interface 210. The controller 206 receives the marking style. The user interface 210 further allows the user to select an option of how the scanned document is to be saved. One example of the user interface 210 is shown in FIG. 3A. As per the user interface 210, options 302, 304, and 306 are provided to the user. The option 302 allows the user to select if he wishes to extract the data. The option 302 further includes sub-options 301 and 303. If the user wishes to extract the data, the user selects the sub-option 301, else the user selects the sub-options 303. The option 304 allows the user to select a marking style, corresponding to which he wishes to extract the marked content, for example. There can be multiple marking styles such as braille alphabets and numbers, highlight, other types of marking and so on. In context of the current disclosure, the user can choose the marking style—braille alphabets and numbers from the drop down menu 305. The option 306 allows the user to select a format to save the scanned document. For example, the user can select the option via a drop down menu 307, for example, PDF. The user interface 210 further includes a function that the user wishes to perform on the marked content, for example, the extract function (marked as 309), delete function (311), replace function (313) and share function (315). The extract function 309 allows the user to extract the content from the scanned document based on the marking and include the extracted content in a new file. The delete function 311 allows the user to delete the content from the scanned document based on the marking. The replace function 313 allows the user to replace content from the document with a new content based on the marking. The share function 315 allows the user to share the content in multiple forms. The user interface 210 shown is exemplary in nature and can have more variations.

Based on the input provided by the user through the user interface 210, the controller 206 proceeds further. For example, if the user selects the option to extract the data from the document, the controller 206 proceeds further. The controller 206 passes the scanned document and input to the braille optical character recognition module 208 for further processing. The braille optical character recognition module 208 parses the scanned document to identify the one or more starting identifiers and corresponding ending identifiers marked in the document. Once identified, the braille optical character recognition module 208 identifies, and extracts content marked between the one or more starting identifiers and corresponding ending identifiers. The braille optical character recognition module 208 then analyzes the one or more starting identifiers and the corresponding ending identifiers to identify a sequence given in the starting identifiers and ending identifies. The braille optical character recognition module 208 passes the identified sequence and the extracted content to the controller 206 for arranging the extracted content according to the identified sequence. The controller 206 further arranges the extracted content according to the given sequence based on the analysis of the one or more starting identifiers and the corresponding ending identifiers. Once the extracted content is arranged according to the given sequence, the controller 206 finally generates a new a file including the extracted content according to the given sequence. In this manner, the content is extracted from the scanned document based on the one or more identifiers.

The document 400 is an input to the multi-function device 102. According to the implementation of the method, an output 420 is generated as shown in FIG. 4B. The output 420 includes a new file 420 including the extracted content arranged in an order. The order indicates a sequence given in the braille markings. For example, the content 404 is placed first, then the content 406 is arranged and finally the content 402 is put at the end. The sequence of arranging the content is based on the numbers in the braille markings i.e., 1, 2 and 3.

Although FIG. 2 is discussed with respect to extraction of content, but FIG. 2 can be implemented for any function as selected by the user based on the requirement. For example, if the function selected by the user is delete function, then the controller 206 deletes the marked content from the scanned document resulting in a different scanned document including the remaining content. In another example, if the function selected by the user is replace function, the controller 206 proceeds accordingly. The controller 206 provides a user interface to the user to input new content to be replaced with the marked content. The controller 206 receives the new content and include the new content in the scanned document in place of the marked content. In this manner, the scanned document is ready with the new content. In further example, if the function selected by the user is a share function, the controller 206 proceeds accordingly. The controller 206 extracts the marked content from the scanned document and includes the extracted content in a new file. The new file includes all the extracted content. The controller 206 then shares the new file with the user via his email address. The controller 206 may share the new file with other users and/or other devices. More details will be discussed below.

In some implementations, FIG. 2 may be implemented in the form of a system having a scanner and a server (although not shown). The scanner may be replaced by a multi-function device. The scanner performs the functionalities of generating a scanned document and the server performs the functionalities as discussed with respect to the controller 206 of FIG. 2. Based on the selection of the function to be performed on the marked content, the server performs one of: extracts the marked content, deletes the marked content, replaces the marked content or shares the marked content. One example is discussed here. The system includes a scanner to: receive the document having content marked using one or more beginning identifiers and corresponding ending identifiers, wherein the content marked between each beginning identifier and corresponding ending identifier indicates content for extraction, wherein the content is marked using braille symbols; initiate scanning of the document to generate a scanned document. The server is communicatively coupled to the scanner to: receive the scanned document from the scanner; analyze the scanned document to identify the one or more starting identifiers and the corresponding one or more ending identifiers; extract the content marked between the one or more starting identifiers and the corresponding one or more ending identifiers; and generate a new file to include the extracted content.

FIG. 4I represents a flow diagram 430 with respect to extraction, wherein the multi-function device 102 receives the document 432 having content marked using one or more identifiers i.e., include markings at required portions. The document 432 is an input to the multi-function device 102. The multi-function device 102 scans the received document and then displays a user interface 434 to the user to provide one or more inputs i.e., function selection, marking style, output type and so on. The multi-function device 102 generates a new file including content extracted from the marked portions and can be further saved as PDF such as 436.

Exemplary Flowcharts
Extraction

Figure 5A:
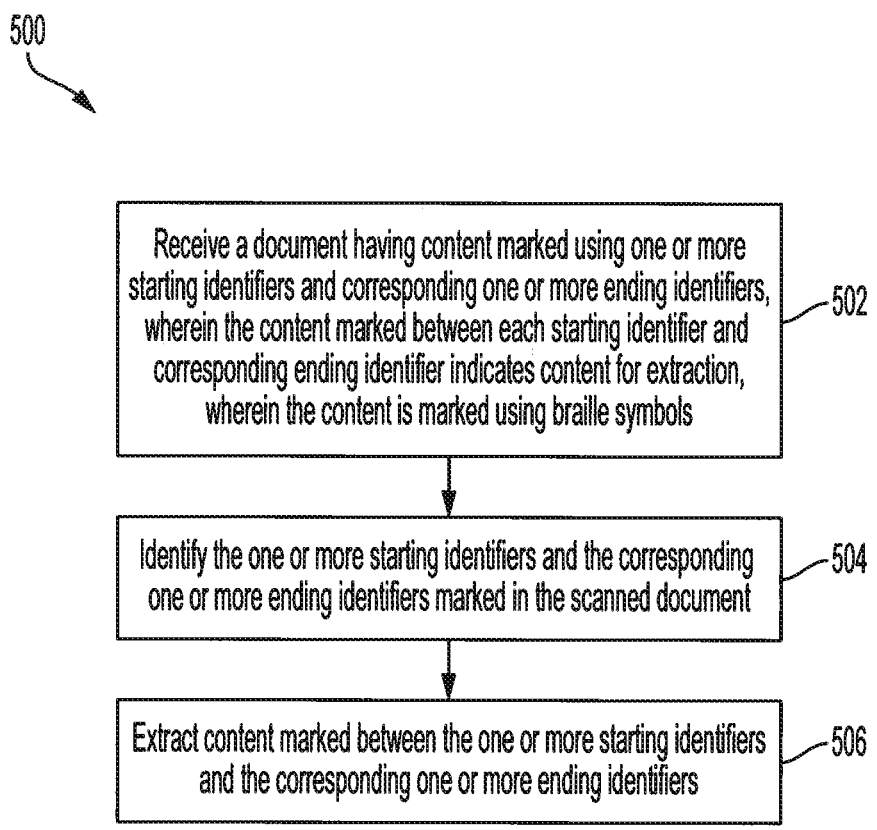
FIGS. 5A-5B represent a flowchart for extracting content from a document based on one or more identifiers.
Figure 5B:
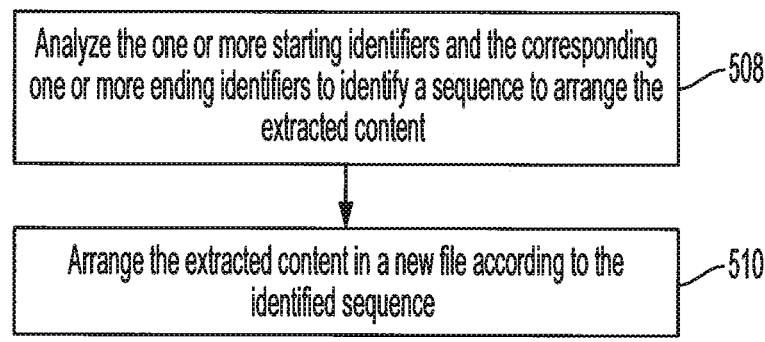

FIGS. 5A-5B represent a method flowchart 500 for handling a document having content marked using one or more identifiers, for example, extracting content from the document. The method 500 may be implemented by a multi-function device or any other equivalent device having scanning functionality such as a scanner without limiting the scope of the disclosure. The method 500 is implemented when a user has a document and he wishes to extract some content from the document. In such cases, the user marks the content to be extracted using one or more identifiers i.e., starting identifiers and corresponding identifiers. The content to be extracted is marked using one or more starting identifiers and corresponding ending identifiers. The start of the content is marked using a starting identifier and end of the content is marked using a corresponding ending identifier. Once the user marks the content in the document, the user submits the document to the multi-function device such as 102 for further processing. The one or more starting identifiers and corresponding one or more ending identifiers are based on braille symbols. The content is marked using an erasable marking device such as a pencil.

At 502, the document having content marked using the one or more starting identifiers and corresponding one or more ending identifiers is received. For example, the content may be one or more lines from the same page or different pages of the document. The content marked between each starting identifier and corresponding ending identifier indicates content for extraction. Post this, a user interface is provided to the user for marking style. The user selects a marking style via the user interface. Based on the selection, the method 500 proceeds further. After receiving the marking style from the user, scanning of the document is initiated. The document is scanned to generate a scanned document. The scanned document is considered for further processing. At 504, the one or more starting identifiers and the corresponding one or more ending identifiers marked in the scanned document are identified. Once the identifiers are identified, content marked between each starting identifier and corresponding ending identifier is identified. At 506, the content marked between the one or more starting identifiers and the corresponding one or more ending identifiers is extracted.

At 508, the one or more starting identifiers and the corresponding one or more ending identifiers are analyzed to identify a sequence to arrange the extracted content. At 510, the extracted content is arranged in a new file according to the identified sequence. The file may be of a pre-defined format such as MS word, PDF or the like. The file includes the content which is relevant for the user or of interest for the user i.e., the content marked using the identifiers. In some cases, the extracted content may be converted into an encrypted hyperlink or a QR code such that the user can access the extracted content only after providing valid credentials. For example, the user can provide his username and/or password to access the hyperlink or the QR code. Upon providing the valid credentials, the user can obtain the extracted content. Here, a new file is generated to include the extracted content. The new file is first saved in a location, for example, default cloud location, user preferred location or any other location accessible by the multi-function device. If the user wants to share the new file, then the QR code or link is generated then based upon the user preference the new file can be shared via email. More details are discussed in FIG. 6B.

The methods 700 may be implemented by non-transitory computer-readable medium storing instructions, which when executed by one or more processors cause the one or more processors to implement the method blocks 702, 704, 706, 708, and 710. Similarly, the method 500 may be implemented by non-transitory computer-readable medium storing instructions, which when executed by one or more processors cause the one or more processors to implement the method blocks 502, 504, 506, 508, and 510. For example, the non-transitory computer-readable medium including instructions executable by a processing resource to: receive the document having content marked using one or more starting identifiers and corresponding one or more ending identifiers, wherein the content marked between each starting identifier and corresponding ending identifier indicates content for extraction, wherein the content is marked using braille symbols; scan the document to generate a scanned document; identify the one or more starting identifiers and the corresponding one or more ending identifiers marked in the document; extract content marked between the one or more starting identifiers and the corresponding one or more ending identifiers; analyze the one or more starting identifiers and the corresponding one or more ending identifiers to identify a sequence to arrange the extracted content; arrange the extracted content according to the identified sequence in a new file.

Additionally, the non-transitory computer-readable medium including instructions executable by a processing resource to provide a user interface displaying one or more identifiers for user selection. The non-transitory computer-readable medium including instructions executable by a processing resource to receive a selection of the one or more identifiers for extracting the content. The non-transitory computer-readable medium including instructions executable by a processing resource wherein the one or more starting identifiers and corresponding one or more ending identifiers are based on braille symbols. The non-transitory computer-readable medium including instructions executable by a processing resource, wherein the content is marked using an erasable marking device. The non-transitory computer-readable medium including instructions executable by a processing resource, wherein the content includes one or more lines. The non-transitory computer-readable medium including instructions executable by a processing resource, wherein the one or more starting identifiers and corresponding one or more ending identifiers are marked before the start of the content and after the end of the content, respectively.

Deletion

The methods, systems and non-transitory computer-readable medium are discussed with respect to extraction of content and the extracted content is included in a new file. But the methods, systems and non-transitory computer-readable medium can be implemented where the marked content is for deletion, replacement and sharing. One such exemplary method for deleting content from a document while scanning is disclosed. The user marks the content in the document which is to be deleted. The content is marked using one or more starting identifiers and corresponding ending identifiers. The method begins with receiving the document having content marked using the one or more starting identifiers and corresponding one or more ending identifiers, wherein the content marked between each starting identifier and corresponding ending identifier indicates the content for deletion, wherein the content is marked using braille symbols. The content may be marked using the same starting identifiers and corresponding ending identifiers. For example, line 1 may be marked using an identifier i.e., starting identifier and a corresponding ending identifier but the line 2 may be marked using the same identifier i.e., starting identifier and a corresponding ending identifier. The document is then scanned to generate a scanned document. The scanned document is analyzed to identify the one or more starting identifiers and the corresponding one or more ending identifiers. The content marked between the one or more starting identifiers and the corresponding one or more ending identifiers is deleted from the scanned document resulting in a different scanned document, wherein the resulted scanned document includes the remaining content The user can mark the content using any braille representation, be it alphabets, numbers, alphanumeric etc. based on the requirement of the user. For example, the user can mark the braille representation of alphabets such as c, b, a and so on. In such cases, the output includes the extracted content in the order as a, b and c. In another example, the user can mark the braille representation of numbers such as 2, 1, 3 and so on. In such cases, the output includes the extracted content in the sequence as 1, 2, and 3. In further example, the user can mark the content using braille alphanumeric symbols such as a2, b1, a1, b2 and so on. In such cases, the output includes the extracted content in a sequence, where first alphabets and then numbers are considered for arranging the extracted content. As a result, the output includes the extracted content in the sequence as a1, a2, b1, and b2.

The present disclosure is discussed with respect to extract and delete function. But the disclosure can be implemented for other functions such as replace or share. These case scenarios for replace and share are discussed below.

Replace

Figure 6A:
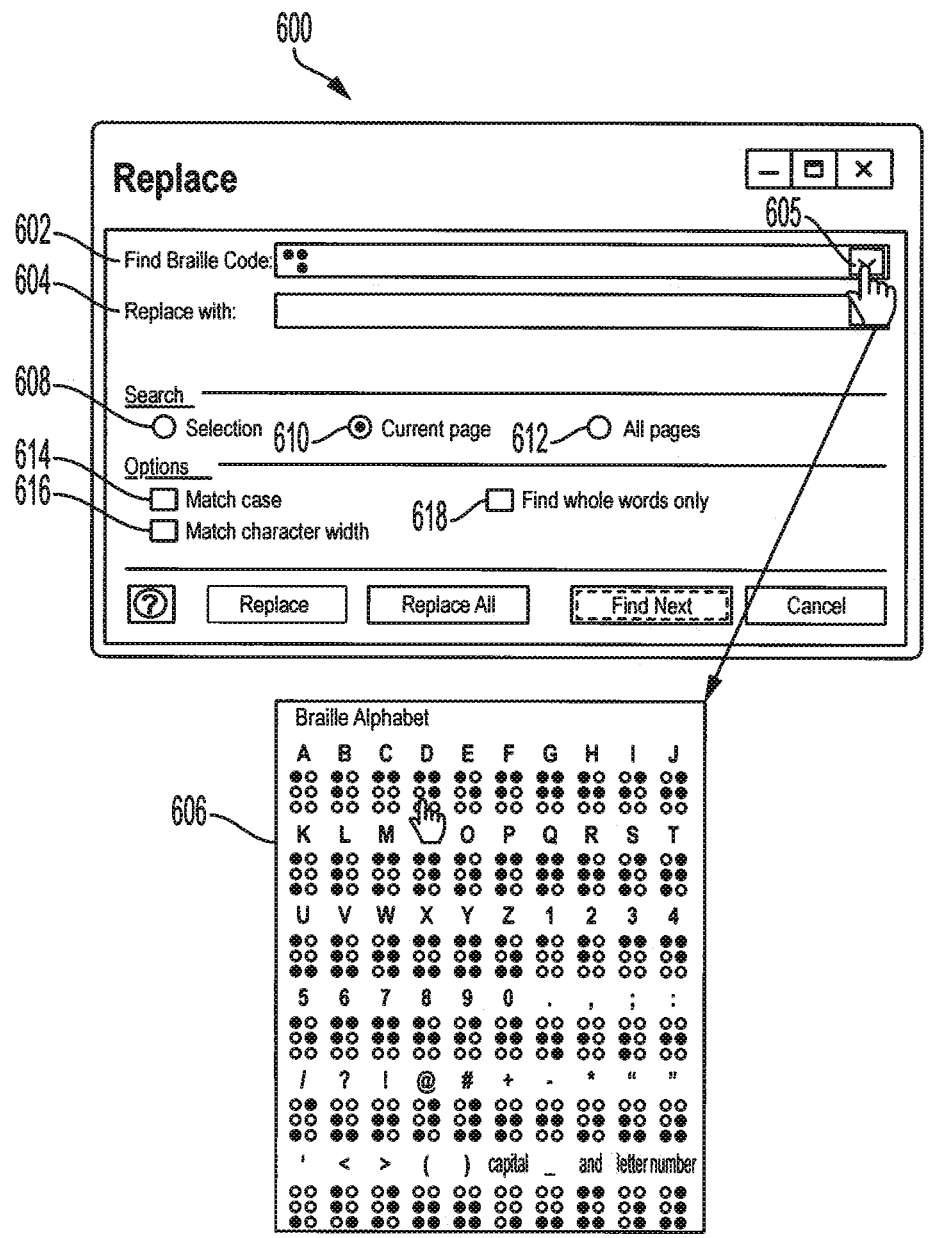
FIGS. 6A-6B illustrate exemplary snapshots.

The user can replace one or more lines of the document. The user provides the marked document to the multifunction device for processing. The marked document includes content marked using one or more starting identifiers and corresponding ending identifiers. The multi-function device receives the marked document and provides a user interface to the user. The user can select the replace function from the user interface as shown in above figures such as FIG. 3B. Upon selection of the replace function, a new dialog box or user interface 600 appears as shown in FIG. 6A. The dialog box 600 includes multiple options such as 602 and 604. Through the option 602, the user finds a braille code to be replaced via a drop down menu option 605. The drop down menu 605 allows the user to select a specific braille code. Upon selecting the drop down menu 605, a table 606 including alphabets, numbers, special characters and corresponding braille representation is shown. Through the option 604, the user provides a new content to be included in place of the marked content. The user can provide the new content in the textbox. Based on the selected identifier and the user input, the multi-function device identifies the content marked with the selected identifier in the document. Once identified, the multi-function device replaces the identified content with the user provided input content. In this manner, the multi-function device replaces the content in the scanned document. Other options such as 608, 610 and 612 are included. The option 608 allows the user to select pages where content needs to be replaced. The option 610 allows the user to replace content on the current page selection. The option 612 allows the user to replace content on all pages of the scanned document. Other options such as 614, 618 and 616 allows the user to find the match case, whole words, or match character width. This approach saves time of the user and the original document is not wasted.

Share

Figure 6B:
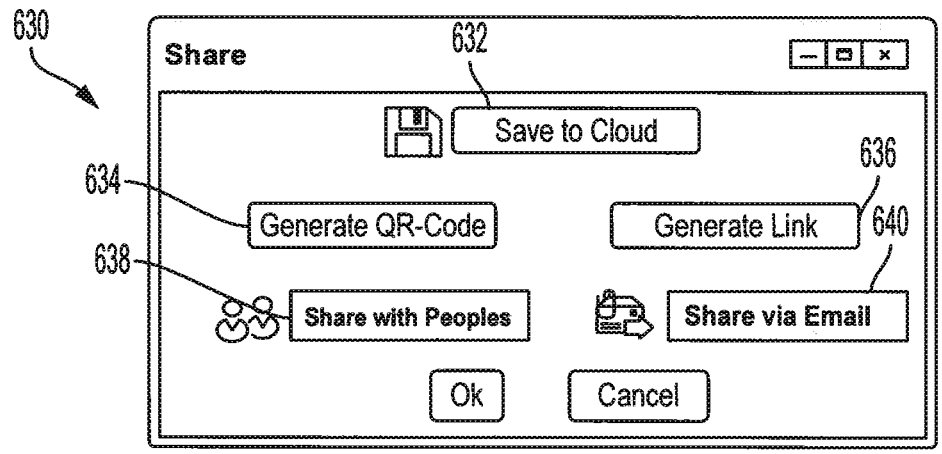
Figure 6B:
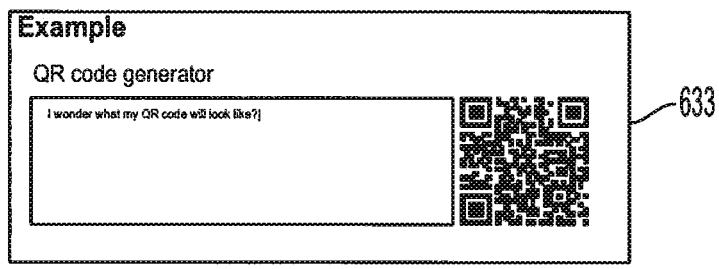
Figure 6B:
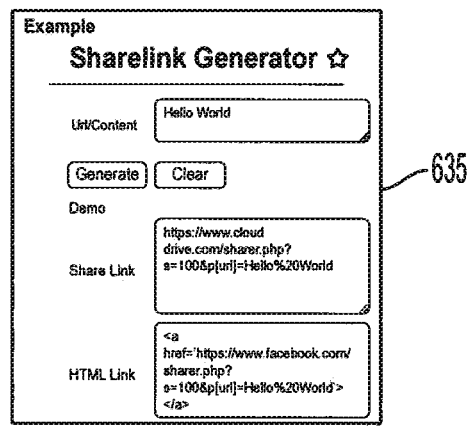

The present disclosure can be implemented where the extracted content can be converted into an encrypted hyperlink or a QR code such that the user can access the content only after providing valid credentials. The extracted content can be transferred in the form of a QR code or the hyperlink via an email as an attachment such that the user can access the email from any devices such as tablets, phones etc., Upon entering the valid credentials, the extracted content is decrypted and displayed to the user. This approach helps secure content. Upon selecting the option share, a dialog box 630 appears as shown in FIG. 6B. The user can select any options 632, 634, 636, 638 and 640. For example, the user can select the option 632 when the user wishes to the save the extracted content to cloud. The user can select the option 634 when the user wishes to share the extracted content in the form of a QR code. The QR code as generated is shown as 633. The user can select the option 636 when the user wishes to share the extracted content in the form of a hyperlink. The hyperlink generator is shown as 635. The user can select the option 638 when the user wishes to share the extracted content with multiple users. The user requires to provide multiple email addresses of the users with whom he wishes to share the extracted content via the email. The user can select the option 640 when the user wishes to send the extracted content to his email. In this manner, the user can access any of the options to share the extracted content.

The methods and systems allow a user to simply mark content using one or more identifiers. The methods and systems do not require the user to highlight the content hence reduces manual work to highlight the content. The methods and systems saves a huge time in case the document is a large document. The methods and systems make use of a pencil to mark the content such that original document is not affected and the user can easily erase the markings. The methods and systems further allow the user to mark the content using braille symbols which consume minimal space on the document, thereby saves a lot of space, leaves the document in readable state and further avoids any confusion for the user. The methods and systems further provide efficient way of extracting, deleting, replacing and sharing the content from the document based on the one or more identifiers. The methods and systems help easy identification of the content enclosed with the identifiers. In addition, the methods and systems make use of braille numbers and thus, the content can be re-arranged based on the numbers.

The present disclosure can be implemented for scenarios when a user wishes to extract content from a document such as extracting questions from question papers. For example, a question paper contains different questions from various chapters arranged in a random order. In order to extract the questions chapter wise, the disclosure is implemented. The present disclosure can be implemented when the user wishes to have/extract some key points from the document. The methods and systems allow the user to save the extracted content in different formats. The present disclosure does not require any highlighting of the content or any marking of the complete marking of the content. Instead, starting and ending identifiers are used to mark the content for extraction. The content is marked using an erasable marking device, where the starting and ending identifiers can be erased. As a result, the document submitted for scanning is not affected and remains as is. The methods and systems save a huge time and effort in case of a large document. The methods and systems reduce manual work to highlight the content. The methods and systems provide an easy way to identify content marked between the identifiers. The methods and systems allow the user to number the document based on the braille alphabets and numbers and further aligns the content based on the braille numbers. The methods and systems allow easy quick extraction of the content with zero impact on the document. The present disclosure uses the identifiers to enclose the content for extraction between the starting identifier and the ending identifier. The methods and systems provide a user friendly way to mark content in the document for extraction at later stages. The methods and systems reduce manual effect.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, displaying, providing, extracting, sharing, replacing, deleting, scanning, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for handling content of a document based on one or more identifiers, the method comprising:
    receiving the document having content marked using one or more starting identifiers and corresponding one or more ending identifiers, wherein the content marked between each starting identifier and corresponding ending identifier indicates content for one of: extraction, deletion, replacement and sharing, wherein the content in the document is marked using braille symbols;
    receiving a selection of a function to be performed on the marked content;
    scanning the document to generate a scanned document;
    analyzing the scanned document to identify the one or more starting identifiers and the corresponding one or more ending identifiers; and
    based on the selection of the function to be performed on the marked content, performing one of:
        extracting the content marked between the one or more starting identifiers and the corresponding one or more ending identifiers, from the scanned document;
        deleting the content marked between the one or more starting identifiers and the corresponding one or more ending identifiers, from the scanned document;
        replacing the content marked between the one or more starting identifiers and the corresponding one or more ending identifiers, from the scanned document with a new content; and
        sharing the content marked between the one or more starting identifiers and the corresponding one or more ending identifiers, from the scanned document.

2. The method of claim 1, further comprising identifying the content marked between the one or more starting identifiers and the corresponding one or more ending identifiers, from the scanned document.

3. The method of claim 1, further comprising providing a user interface displaying one or more functions to be performed on the content marked between the one or more starting identifiers and the corresponding one or more ending identifiers.

4. The method of claim 1, further comprising generating a new file comprising the extracted content.

5. The method of claim 1, further comprising providing a user interface to input the new content to be included in place of the marked content in the scanned document.

6. The method of claim 1, further comprising receiving the new content as input by a user.

7. The method of claim 1, wherein deleting the identified content marked between the one or more starting identifiers and the corresponding one or more ending identifiers from the scanned document resulting in a different scanned document, wherein the resulted scanned document comprises the remaining content.

8. A method for extracting content from a document while scanning, the method comprising:
    receiving the document having content marked using one or more starting identifiers and corresponding one or more ending identifiers, wherein the content marked between each starting identifier and corresponding ending identifier indicates content for extraction, wherein the content in the document is marked using braille symbols;

scanning the document to generate a scanned document;

analyzing the scanned document to identify the one or more starting identifiers and the corresponding one or more ending identifiers;

extracting the content marked between the one or more starting identifiers and the corresponding one or more ending identifiers, from the scanned document; and generating a new file comprising the extracted content.

9. The method of claim 8, further comprising analyzing the one or more staffing identifiers and the corresponding one or more ending identifiers to identify a sequence to arrange the extracted content.

10. The method of claim 9, further comprising arranging the extracted content in the new file according to the identified sequence.

11. The method of claim 8, further comprising providing a user interface displaying one or more marking styles for selection.

12. The method of claim 8, further comprising receiving a selection of a marking style for extracting the content.

13. The method of claim 8, wherein the one or more starting identifiers and corresponding one or more ending identifiers are based on braille symbols.

14. The method of claim 8, wherein the content in the document is marked using an erasable marking device.

15. The method of claim 8, wherein the one or more starting identifiers and corresponding one or more ending identifiers are marked before the start of the content and after the end of the content, respectively.

16. The method of claim 8, wherein the content comprises one or more lines.

17. A method for deleting content from a document while scanning, the method comprising:

receiving the document having content marked using one or more starting identifiers and corresponding one or more ending identifiers, wherein the content marked between each starting identifier and corresponding ending identifier indicates content for deletion, wherein the content is marked using braille symbols;

scanning the document to generate a scanned document;

analyzing the scanned document to identify the one or more starting identifiers and the corresponding one or more ending identifiers;

identifying the content marked between the one or more starting identifiers and the corresponding one or more ending identifiers, from the scanned document; and deleting the identified content marked between the one or more starting identifiers and the corresponding one or more ending identifiers from the scanned document resulting in a different scanned document, wherein the resulted scanned document comprises the remaining content.

18. The method of claim 17, wherein the one or more starting identifiers and corresponding one or more ending identifiers are based on braille symbols.

19. The method of claim 17, wherein the content is marked using an erasable marking device.

20. A multi-function device for extracting content from a document while scanning, the multi-function device comprising:

a platen to receive the document having content marked using one or more starting identifiers and corresponding ending identifiers, wherein the content marked between each starting identifier and corresponding ending identifier indicates content for extraction, wherein the content is marked using braille symbols;

a scanner to scan the document to generate a scanned document; and a controller to:

analyze the scanned document to identify the one or more starting identifiers and the corresponding one or more ending identifiers marked in the scanned document;

extract the content marked between the one or more starting identifiers and the corresponding on or more ending identifiers, from the scanned document; and generate a new file to include the extracted content.

21. The multi-function device of claim 20, wherein the controller is to analyze the one or more starting identifiers and the corresponding one or more ending identifiers to identify a sequence to arrange the extracted content.

22. The multi-function device of claim 21, wherein the controller is to arrange the extracted content in the new file according to the identified sequence.

23. The multi-function device of claim 20 further comprising a user interface to display one or more marking styles for user selection.

24. The multi-function device of claim 20, wherein the one or more starting identifiers and corresponding ending identifiers are based on braille symbols.

25. The multi-function device of claim 20, wherein the content is marked using an erasable marking device.

26. The multi-function device of claim 20, wherein the one or more starting identifiers and corresponding ending identifiers are marked before the start of the content and after the end of the content, respectively.

27. The multi-function device of claim 20, wherein the content comprises one or more lines.

28. A multi-function device for handling content of a document based on one or more identifiers, the multi-function device comprising:

a platen to receive the document having content marked using one or more starting identifiers and corresponding one or more ending identifiers, wherein the content marked between each starting identifier and corresponding ending identifier indicates content for one of: extraction, deletion, replacement and sharing, wherein the content in the document is marked using braille symbols;

a user interface to receive a selection of a function to be performed on the marked content;

a scanner to scan the document to generate a scanned document;

a controller to:

analyze the scanned document to identify the one or more starting identifiers and the corresponding one or more ending identifiers; and based on the selection of the function to be performed on the marked content, perform one of:

extract the content marked between the one or more starting identifiers and the corresponding one or more ending identifiers, from the scanned document;

delete the content marked between the one or more starting identifiers and the corresponding one or more ending identifiers, from the scanned document;

replace the content marked between the one or more starting identifiers and the corresponding one or more ending identifiers, from the scanned document with a new content; and share the content marked between the one or more starting identifiers and the corresponding one or more ending identifiers, from the scanned document.

29. The multi-function device of claim 28, wherein the controller is to identify the content marked between the one or more starting identifiers and the corresponding one or more ending identifiers, from the scanned document.

30. The multi-function device of claim 28, wherein the user interface is to display one or more functions to be performed on the content marked between the one or more starting identifiers and the corresponding one or more ending identifiers.

31. The multi-function device of claim 28, wherein the controller is to generate a new file comprising the extracted content.

32. The multi-function device of claim 28, wherein the user interface is provided to input the new content to be included in place of the marked content in the scanned document.

33. The multi-function device of claim 32, wherein the controller is to receive the new content as input by a user.

34. The multi-function device of claim 28, wherein deleting the identified content marked between the one or more starting identifiers and the corresponding one or more ending identifiers from the scanned document resulting in a different scanned document, wherein the resulted scanned document comprises the remaining content.

* * * * *